US012296617B2

(12) United States Patent
Compo

(10) Patent No.: US 12,296,617 B2
(45) Date of Patent: May 13, 2025

(54) CONTAINER HOLDER

(71) Applicant: Travis Compo, Perkinsville, VT (US)

(72) Inventor: Travis Compo, Perkinsville, VT (US)

( * ) Notice: Subject to any disclaimer, the term of this patent is extended or adjusted under 35 U.S.C. 154(b) by 44 days.

(21) Appl. No.: 18/334,754

(22) Filed: Jun. 14, 2023

(65) Prior Publication Data

US 2024/0416675 A1 Dec. 19, 2024

(51) Int. Cl.
*B44D 3/14* (2006.01)

(52) U.S. Cl.
CPC .................................... *B44D 3/14* (2013.01)

(58) Field of Classification Search
CPC .................................................... B44D 3/14
See application file for complete search history.

(56) References Cited

U.S. PATENT DOCUMENTS 3,341,242 A * 9/1967 Carson ............... A47G 23/0208 D7/706
3,980,264 A * 9/1976 Tomasik ................... E06C 7/14 248/912
3,987,993 A * 10/1976 Hopkins ................... E06C 7/14 248/210
4,036,463 A * 7/1977 Hopkins ................ B44D 3/123 248/210
5,007,612 A * 4/1991 Manfre .............. A47G 23/0225 248/314
5,106,045 A * 4/1992 Bezotte ..................... E06C 7/14 248/210
5,320,263 A * 6/1994 Kobylack ............ A63B 55/408 224/558
5,433,361 A * 7/1995 O'Malley ............ A63B 55/408 224/558
5,853,158 A * 12/1998 Riggle ............... A47G 23/0225 248/278.1
5,992,624 A * 11/1999 Hodson .................... B25H 3/00 248/318

(Continued)

OTHER PUBLICATIONS

Twin can caddy sold by E.T. Tobey company https://ettobey.com/products/twin-can-caddy dated: 2021 (Year: 2021).*

(Continued)

*Primary Examiner* — Terrell L McKinnon
*Assistant Examiner* — Ding Y Tan
(74) *Attorney, Agent, or Firm* — Downs Rachlin Martin PLLC

(57) ABSTRACT

A can holding device is provided that includes a clamping or grasping portion with a support member extending from the clamping or grasping portion. A can holder portion is pivotably connected at a first end at or near an end of the support member. A second end of the can holder portion is attached to one or more can holders that are designed and configured to hold cans or other containers without an attachment mechanism such that the cans or other containers do not tip over during normal use. In operation, the clamping portion is attached to a suitably sized, stable object at a height that is convenient for the user to access the cans. The pivotable connection to the support member allows the can holder portion to hang vertically no matter what angle the support member is or what orientation the clamping portion assumes.

15 Claims, 8 Drawing Sheets

(56) References Cited

U.S. PATENT DOCUMENTS

| | | | | |
|---|---|---|---|---|
| 6,322,028 | B1 * | 11/2001 | Fleckenstein | E06C 7/14 248/210 |
| 6,325,350 | B1 * | 12/2001 | Mancuso | A63B 55/408 248/230.1 |
| 6,338,459 | B1 * | 1/2002 | Biggs | E06C 7/14 248/210 |
| 6,520,366 | B1 * | 2/2003 | Bradley | A47G 19/065 220/23.6 |
| 7,959,121 | B1 * | 6/2011 | Barnes, Jr. | A47G 23/0225 248/311.2 |
| 7,967,264 | B1 * | 6/2011 | Peterson | E06C 7/143 182/115 |
| 9,642,485 | B2 * | 5/2017 | Kuznicki, Jr. | F16B 1/00 |
| 9,677,594 | B1 * | 6/2017 | Hemmerlin | F16M 13/02 |
| 9,848,691 | B1 * | 12/2017 | Pedersen | A45F 5/10 |
| 10,981,654 | B2 * | 4/2021 | Slack, Jr. | A47G 23/0225 |
| 2004/0195746 | A1 * | 10/2004 | Marks | B25B 5/068 269/6 |
| 2008/0061201 | A1 * | 3/2008 | Sasser | E06C 7/14 248/210 |
| 2012/0193853 | A1 * | 8/2012 | Patel | B25B 5/068 269/6 |
| 2014/0284443 | A1 * | 9/2014 | Forbes | A47G 23/0216 248/313 |
| 2020/0002006 | A1 * | 1/2020 | Slack, Jr. | A47C 7/622 |
| 2022/0402100 | A1 * | 12/2022 | Lyons | B25B 5/068 |

OTHER PUBLICATIONS

Drink can online page from Wikipedia https://en.wikipedia.org/wiki/Drink_can dated by web.archive.org to be May 24, 2021 (Year: 2021).*

Brackertron clamp mount drink holder on youtube dated Sep. 13, 2018, https://www.youtube.com/watch?v=jBs3vsP4sc8 (Year: 2018).*

* cited by examiner

CONTAINER HOLDER

FIELD OF THE INVENTION

The present invention relates to construction tools. In particular, the present invention provides a container holder.

BACKGROUND

When used anywhere except on a table, canisters containing liquids or semi-solids, such as paints, stains, and pipe cement, primer and cleaner, for use in applying on object can be difficult to access by a user or be subject to spilling or misplacement.

SUMMARY OF THE DISCLOSURE

A can holder system includes a clamp portion configured to be releasably attached to an object, a support member having a first end and a second end, wherein the first end is attached to the clamp portion and the second end extends away from the clamp portion in a direction parallel to a force applied by the clamp portion against the object when the clamp portion is attached to the object, a can holder support having a first end and a second end, wherein the first end of the can holder support is pivotably attached to the second end of the support member such that, when the clamp portion is attached to the object the can holder support is vertically oriented, a first can holder attached to the second end of the can holder support, wherein the first can holder includes a sidewall and a bottom portion configured to hold a can, wherein when the clamp portion is attached to the object, the first can holder is oriented such that the can held in the first can holder is upright, and a second can holder attached to the second end of the can holder support, wherein the second can holder includes a sidewall and a bottom portion configured to hold a second can, wherein the second can holder is opposite the first can holder, and wherein when the clamp portion is attached to the object, the second can holder is oriented such that the second can held in the second can holder is upright.

A method for supporting cans includes attaching a clamp to an object, wherein the clamp includes a support member extending away from the clamp, wherein a can holder support having a first end and a second end is pivotably attached at the first end to the support member such that, when the clamp is attached to the object the can holder support is vertically oriented, and wherein a plurality of can holders are attached to the second end and each of the plurality of can holders include a bottom such that, when the can holder support is vertically oriented, the bottom of each of the plurality of can holders are horizontal, and placing a can in each of the plurality of can holders.

A can holder system includes a clamp portion configured to be releasably attached to an object, a support member having a first end and a second end, wherein the first end is attached to the clamp portion and the second end extends away from the clamp portion in a direction parallel to a force applied by the clamp portion against the object when the clamp portion is attached to the object, a can holder support having a first end and a second end, wherein the first end of the can holder support is pivotably attached to the second end of the support member such that, when the clamp portion is attached to the object the can holder support is vertically oriented with the first end above the second end, and a can holder attached to the second end of the can holder support, wherein the can holder includes a sidewall and a bottom portion configured to hold a can in an upright position when the clamp portion is attached to the object and the can holder support is vertically oriented.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A can holding device is provided that includes a clamping or grasping portion with a support member extending from the clamping or grasping portion. A can holder portion is pivotably connected (and preferably freely pivotably connected) at a first end at or near an end of the support member. A second end of the can holder portion is attached to one or more can holders that are designed and configured to hold cans or other containers without an attachment mechanism such that the cans or other containers do not tip over during normal use. In operation, the clamping portion is attached to an object such as a stud, rafter, sawhorse, ladder, or other suitably sized, stable object at a height that will result in cans held in the can holder being convenient for the user to access (e.g., not having to bend over or walk several steps). The pivotable connection to the support member allows the can holder portion to hang vertically (with the can holders at the bottom) no matter what angle the support member is secured at or what orientation the clamping portion assumes. In this way, a user can conveniently access cans held in the can holders at an ergonomically appropriate height while reducing the chances that a can tips over (e.g., by being kicked or struck by a 2 by 4).

Figure 1:
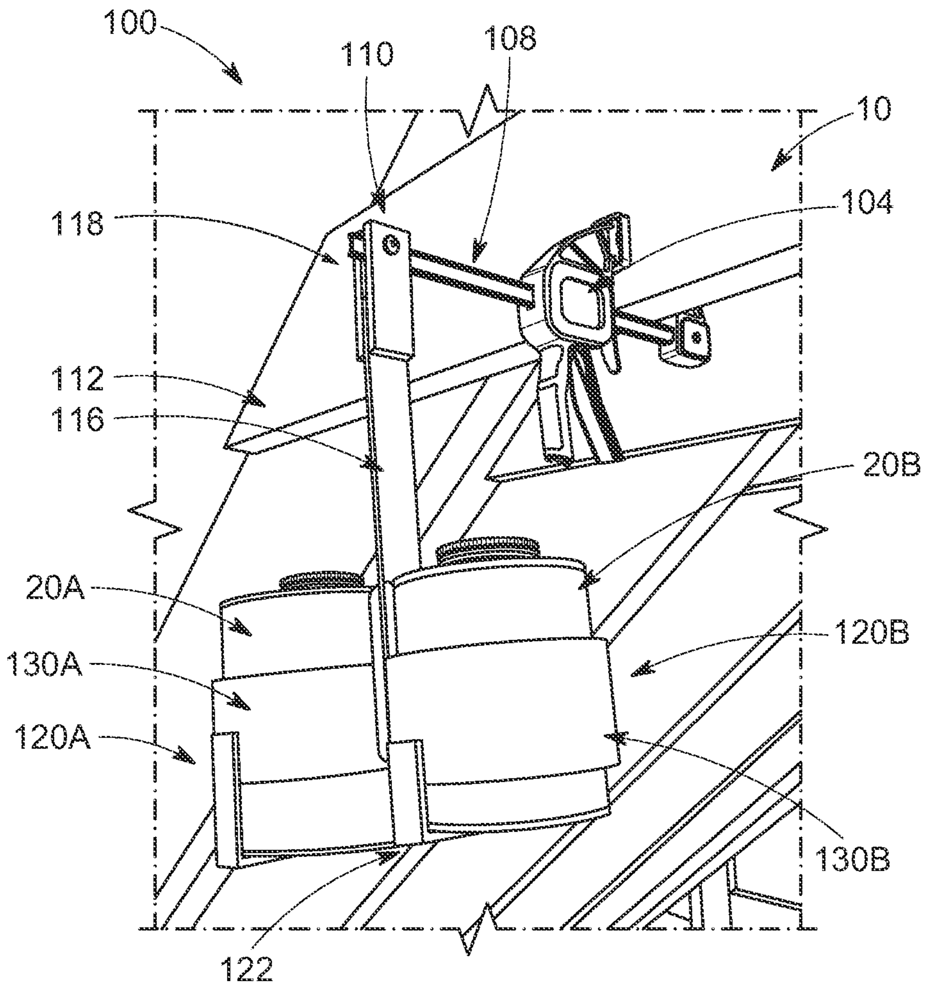
FIG. 1 is a perspective view of a container holder attached to a rafter in accordance with an embodiment of the present invention.
Figure 2:
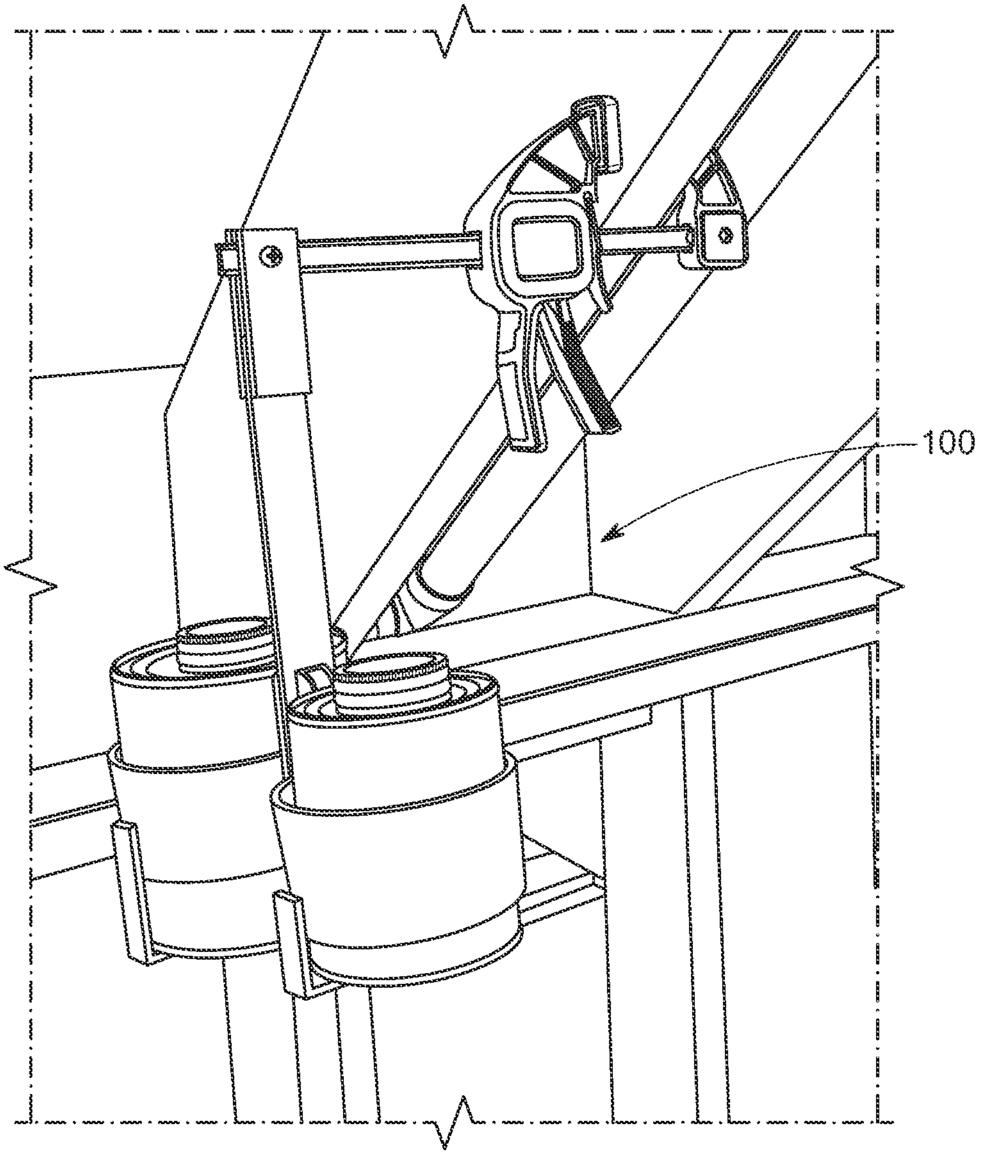
FIG. 2 is another perspective view of the container holder of FIG. 1.
Figure 3:
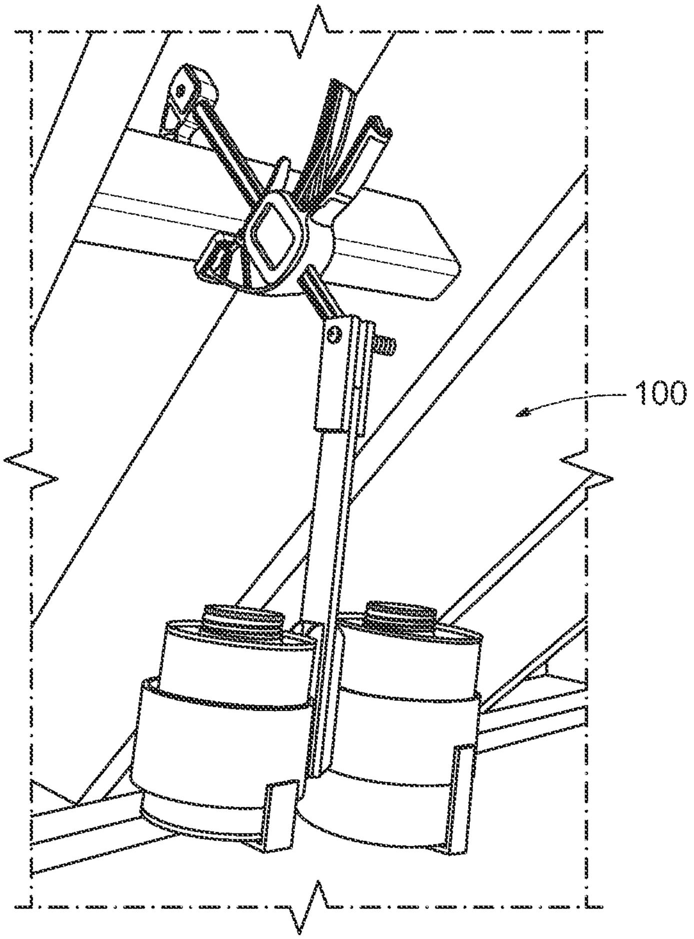
FIG. 3 is a perspective view of a container holder suspended from a ceiling support in accordance with an embodiment of the present invention.
Figure 4:
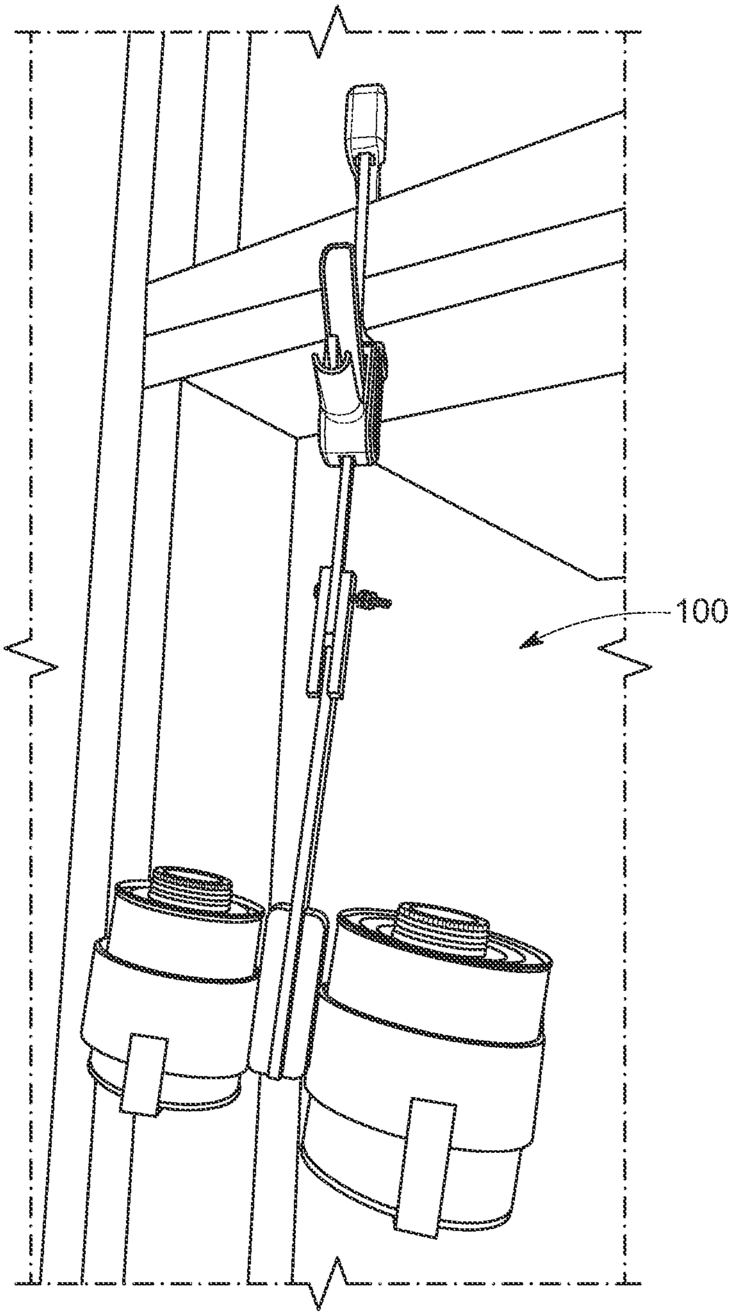
FIG. 4 a perspective view of the container holder suspended at another angle.
Figure 5:
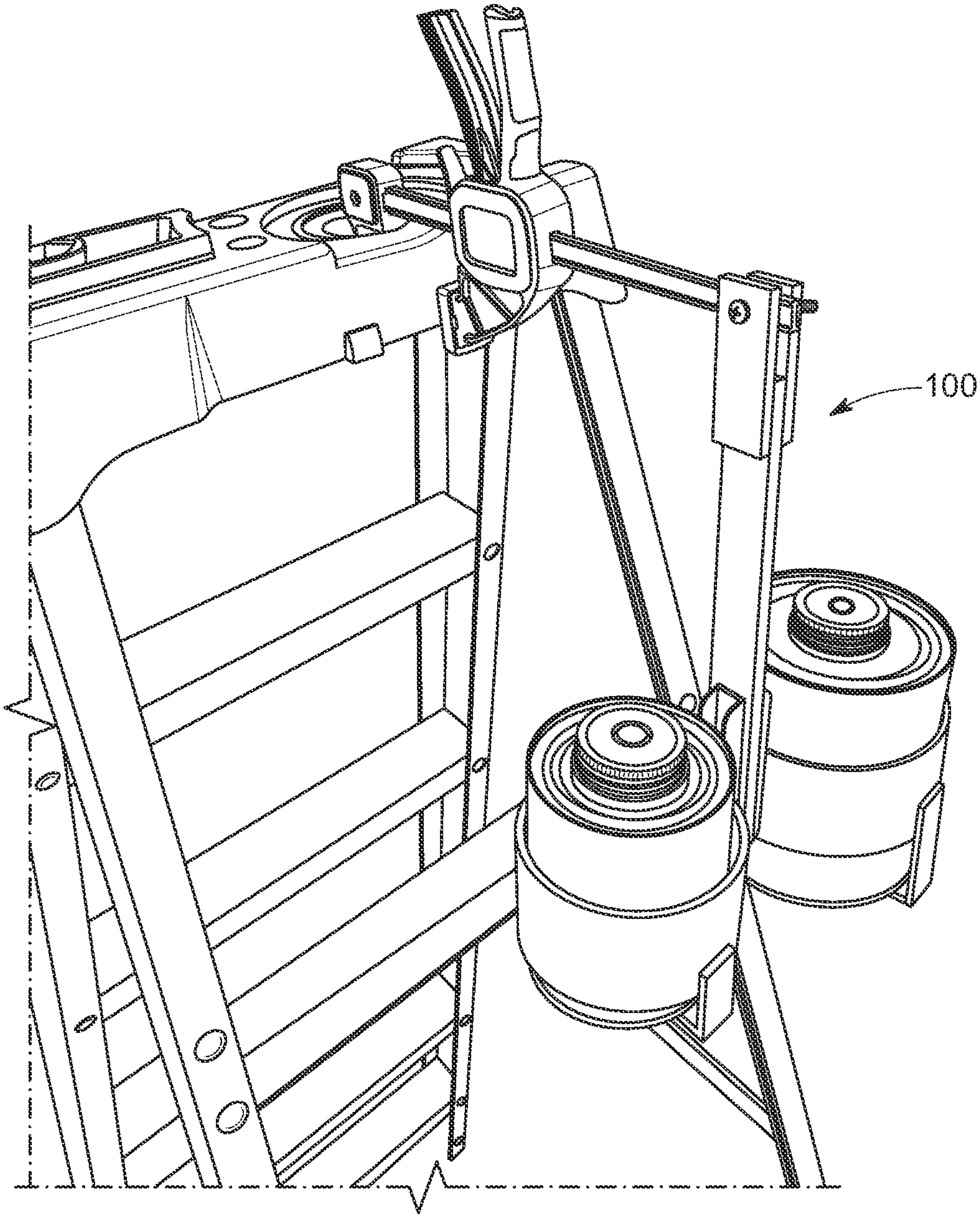
FIG. 5 a perspective view of a container holder suspended from a ladder or saw horse in accordance with an embodiment of the present invention.

Turning to the figures, FIG. 1 shows a can holding device 100 attached to a rafter 10 holding cans 20 (e.g., 20A, 20B). Can holding device 100 includes a clamp portion 104, which may be a trigger clamp, bar clamp, or any suitable grasping/holding device that can be releasably attached (preferably by one hand of a user) to a variety of work area objects with sufficient hold to support can holding device 100. Extending from one end of clamp portion 104 is a support member 108. While support member 108 may be in any orientation with respect to clamp portion 104, it is preferably perpendicular to a surface 30 to which clamp portion 104 is attached, as shown in the figures. Attached to a first end 110 of support member 108 that is distal to clamp portion 104 is a can holder portion 112. Can holder portion 112 includes a rod 116 that is pivotably connected to the first end 110 of support member 108 at a first end 118 and to one or more can holders 120 (e.g., 120A, 120B) at a second end 122. The pivotable connection preferably allows rod 116 to pivot in almost any direction with respect to support member 108. Can holders 120 are attached to rod 116 such that a bottom portion 124 (e.g., 124A, 124B) are generally perpendicular to rod 116 with respect to the lengthwise direction of rod 116.

In this way, can holding device 100 can be attached to objects at various angles and rod 116 will pivot and remain in a vertical orientation (as can be seen in FIGS. 1-5), thus rendering can holders 120 in a horizontal orientation so that cans 20 are held in an upright position. Because clamp portion 104 can be easily and releasably attached to a wide variety of objects, a user may place cans 20 at a convenient location and convenient height with a reduced risk of tipping.

Figure 6:
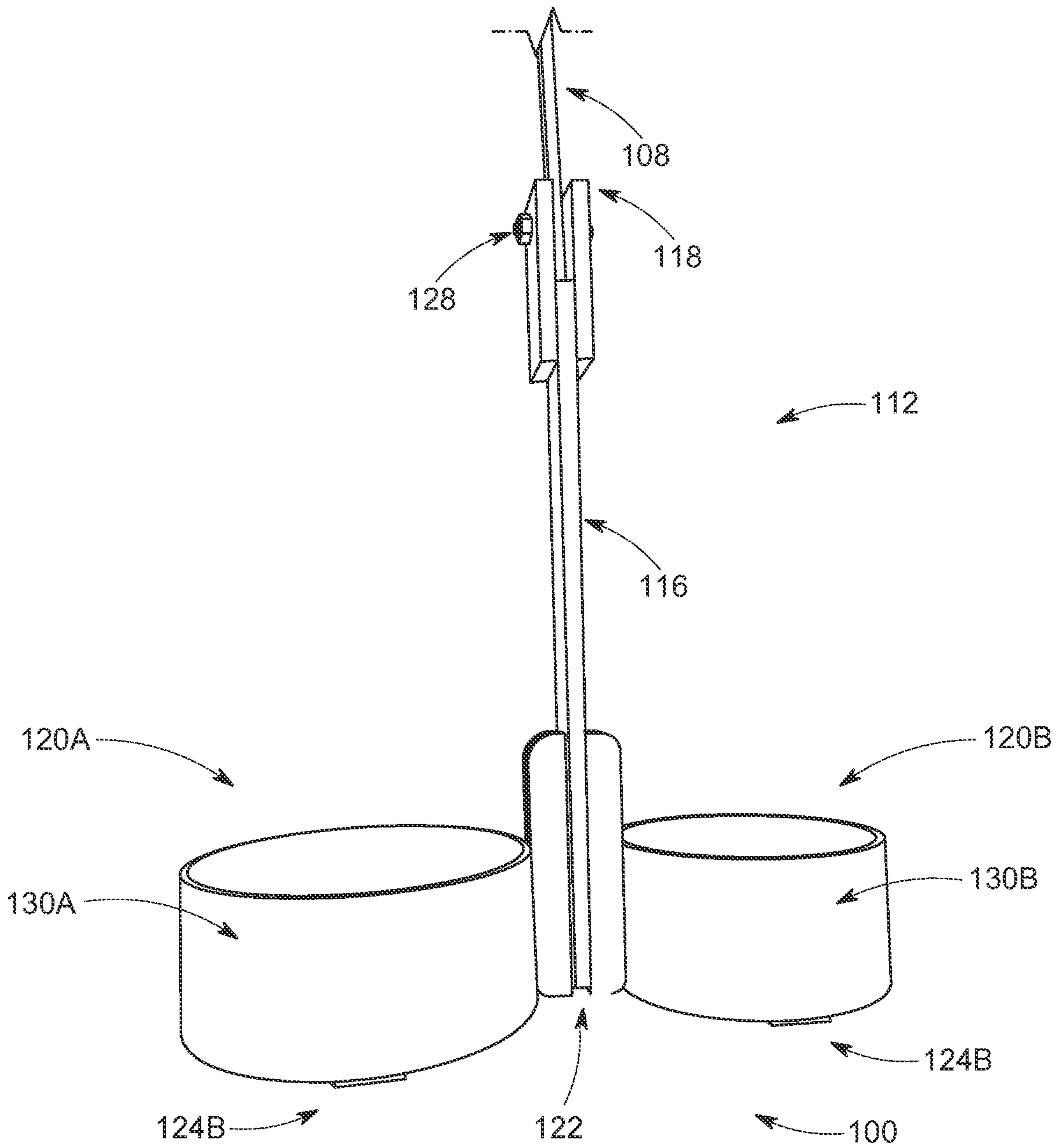
FIG. 6 shows a portion of the container holder without containers in the can holders.
Figure 7:
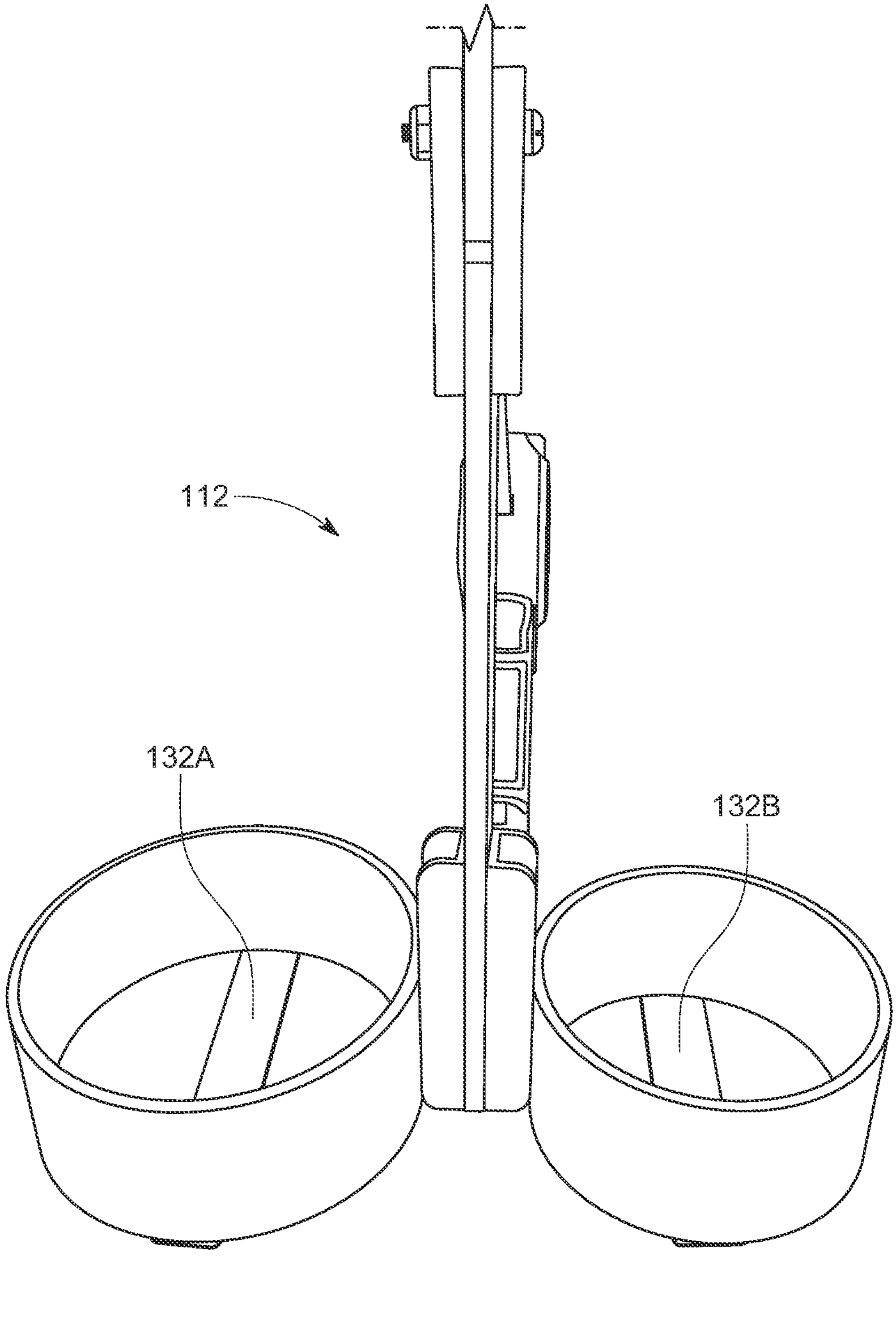
FIG. 7 is a perspective view of the container holder without containers.
Figure 8:
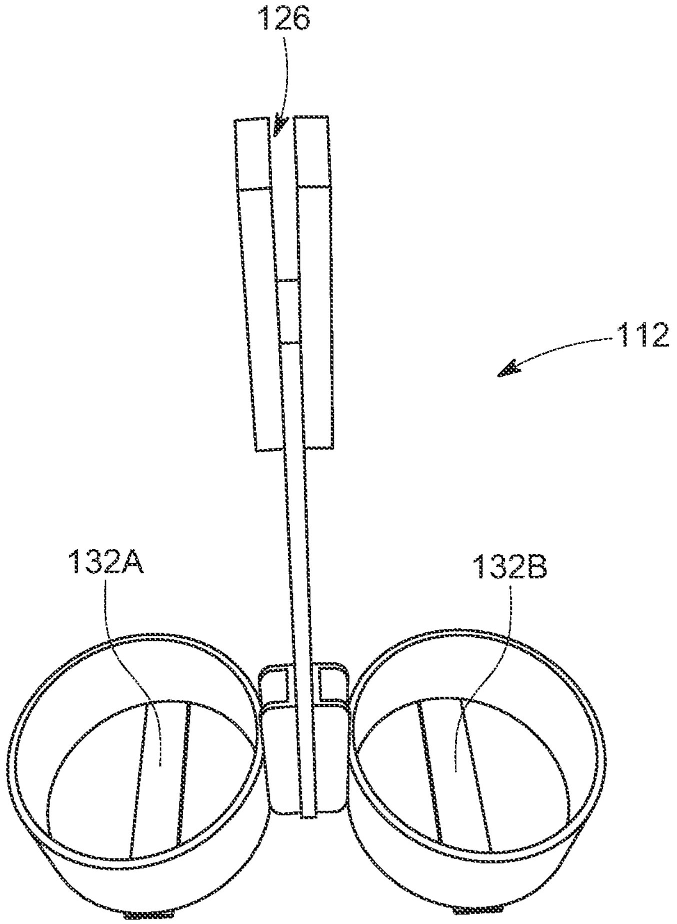
FIG. 8 is a perspective view of a portion of the container holder without containers and disconnected from the clamp portion.

FIGS. 6-7 show the pivotable connection between support member 108 and rod 116, which may be any suitable mechanism such as a slot 126 (as best seen in FIG. 8) for receiving support member 108 which may be secured by a bolt 128.

Can holders 120 may include an outer wall 130 (e.g., 130A, 130B) sized and configured to secure cans or other containers without the need for a separate attachment mechanism. Can holders may be any suitable size, and for many applications, diameters of between to and six inches may be appropriate. Can holders 120 may also include a bottom 132 (e.g., 132A, 132B) for supporting cans 20 which may allow for open space at the bottom to reduce overall weight and to prevent the accumulation of drips. Rod 116 may be any suitable length, and for many applications a length of approximately twelve inches may be appropriate.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A can holder system comprising:

a clamp portion configured to be releasably attached to an object;

a support member having a first end and a second end, wherein the first end is attached to the clamp portion and the second end extends away from the clamp portion in a direction parallel to a force applied by the clamp portion against the object when the clamp portion is attached to the object;

a can holder support having a first end and a second end, wherein the first end of the can holder support is pivotably attached to the second end of the support member such that, when the clamp portion is attached to the object the can holder support is vertically oriented;

a first can holder attached to the second end of the can holder support, wherein the first can holder includes a sidewall and a bottom portion configured to hold a can, wherein when the clamp portion is attached to the object, the first can holder is oriented such that the can held in the first can holder is upright; and a second can holder attached to the second end of the can holder support, wherein the second can holder includes a sidewall and a bottom portion configured to hold a second can, wherein the second can holder is opposite the first can holder, and wherein when the clamp portion is attached to the object, the second can holder is oriented such that the second can held in the second can holder is upright, wherein the clamp portion is a trigger clamp.

2. The can holder system of claim 1, wherein the can holder support is configured to pivot more than 300 degrees about the second end of the support member.

3. The can holder system of claim 1, wherein the first can holder is designed to secure an eight ounce can.

4. The can holder system of claim 1, wherein the first can holder is designed to secure a sixteen ounce can.

5. The can holder system of claim 1, wherein the first end of the can holder support is freely pivotably attached to the second end of the support member.

6. The can holder system of claim 1, wherein the can holder support has a length of less than 15 inches.

7. The can holder system of claim 1, wherein the bottom portion of the first can holder is perpendicular to the can holder support and includes an open area and wherein the bottom portion of the second can holder is perpendicular to the can holder support and includes an open area.

8. The can holder system of claim 5, wherein the sidewall of the first can holder has a diameter of between three and six inches and the second can holder has a diameter of between three and six inches.

9. A can holder system comprising:

a clamp portion configured to be releasably attached to an object;

a support member having a first end and a second end, wherein the first end is attached to the clamp portion and the second end extends away from the clamp portion in a direction parallel to a force applied by the clamp portion against the object when the clamp portion is attached to the object;

a can holder support having a first end and a second end, wherein the first end of the can holder support is pivotably attached to the second end of the support member such that, when the clamp portion is attached to the object the can holder support is vertically oriented with the first end above the second end; and a can holder attached to the second end of the can holder support, wherein the can holder includes a sidewall and a bottom portion configured to hold a can in an upright position when the clamp portion is attached to the object and the can holder support is vertically oriented, wherein the clamp portion is a trigger clamp.

10. The can holder system of claim 9, wherein the can holder support is configured to pivot more than 300 degrees about the second end of the support member.

11. The can holder system of claim 9, wherein the can holder is designed to secure an eight ounce can.

12. The can holder system of claim 9, wherein the can holder is designed to secure a sixteen ounce can.

13. The can holder system of claim 9, wherein the first end of the can holder support is freely pivotably attached to the second end of the support member.

14. The can holder system of claim 9, wherein the bottom portion of the can holder is perpendicular to the can holder support and includes an open area.

15. The can holder system of claim 9, further including a second can holder attached to the second end of the can holder support, wherein the second can holder includes a sidewall and a bottom portion configured to hold a second can, and wherein the second can holder is opposite the can holder.

* * * * *